United States Patent
Ryu et al.

(10) Patent No.: US 6,863,097 B2
(45) Date of Patent: Mar. 8, 2005

(54) APPARATUS AND METHOD FOR DISPENSING LIQUID CRYSTAL

(75) Inventors: Joung-Ho Ryu, Gyoungsangbuk-Do (KR); Hyug-Jin Kweon, Gyoungsangbuk-Do (KR); Hae-Joon Son, Pusan (KR); Kyu-Yong Bang, Gyoungsangbuk-Do (KR); Joon-Young Kim, Gyoungsangbuk-Do (KR); Man-Ho An, Gyoungsangbuk-Do (KR); Yong-Kyu Seo, Gyoungsangbuk-Do (KR)

(73) Assignees: LG Philips LCD Co., Ltd., Seoul (KR); Top Engineering Co., Ltd., Gyoungsangbuk-Do (KR)

(*) Notice: Subject to any disclaimer, the term of this patent is extended or adjusted under 35 U.S.C. 154(b) by 0 days.

(21) Appl. No.: 10/421,714

(22) Filed: Apr. 24, 2003

(65) Prior Publication Data

US 2004/0011422 A1 Jan. 22, 2004

(30) Foreign Application Priority Data

Jul. 20, 2002 (KR) ................................. 10-2002-0042725

(51) Int. Cl.$^7$ ........................... B65B 1/30; B65B 31/00; B67C 3/02
(52) U.S. Cl. ........................... 141/95; 141/67; 141/286
(58) Field of Search ................................ 141/95, 67, 1, 141/31, 65, 4, 7, 286, 301; 222/386, 387, 388

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,597,421 A * | 7/1986 | Wells ............................ 141/5 |
| 4,653,864 A | 3/1987 | Baron et al. |
| 4,690,310 A * | 9/1987 | Rasmussen .................. 222/309 |
| 4,691,995 A | 9/1987 | Yamazaki et al. |
| 4,775,225 A | 10/1988 | Tsuboyama et al. |
| 4,966,205 A * | 10/1990 | Tanaka ........................... 141/9 |
| 5,247,377 A | 9/1993 | Omeis et al. |
| 5,263,888 A | 11/1993 | Ishihara et al. |

(List continued on next page.)

FOREIGN PATENT DOCUMENTS

| | | |
|---|---|---|
| EP | 1 003 066 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |

(List continued on next page.)

*Primary Examiner*—Steven O. Douglas
(74) *Attorney, Agent, or Firm*—Morgan, Lewis & Bockius LLP

(57) ABSTRACT

A liquid crystal dispensing apparatus dispenses liquid crystal onto a substrate. The liquid crystal dispensing apparatus includes a frame, a table, at least one liquid crystal discharge device, and a liquid crystal amount inspecting portion. The table is installed on the frame to have the substrate to be mounted thereon. The liquid crystal discharge device adjustably discharges an amount of liquid crystal, and the liquid crystal amount inspecting portion inspects a liquid crystal dispensing amount by comparing an actual amount of liquid crystal discharged from the liquid crystal discharge device with a preset liquid crystal amount. The liquid crystal discharge device includes a piston to perform ascending motions to draw in the liquid crystal and descending motions to discharge the liquid crystal with an angle of at least a portion of the liquid crystal discharge device determining a magnitude of the ascending/descending motion to control an amount of liquid crystal discharged.

34 Claims, 13 Drawing Sheets

U.S. PATENT DOCUMENTS

| | | | |
|---|---|---|---|
| 5,379,139 A | 1/1995 | Sato et al. | |
| 5,406,989 A | 4/1995 | Abe | |
| 5,499,128 A | 3/1996 | Hasegawa et al. | |
| 5,507,323 A * | 4/1996 | Abe | 141/31 |
| 5,511,591 A | 4/1996 | Abe | 141/7 |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,697,409 A * | 12/1997 | Bishop et al. | 141/284 |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,226,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 2001/0021000 A1 | 9/2001 | Egami | |

FOREIGN PATENT DOCUMENTS

| | | |
|---|---|---|
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 5-127179 | 5/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |

| | | | | | | |
|---|---|---|---|---|---|---|
| JP | 2001-356354 | 12/2001 | | JP | 2002-122873 | 4/2002 |
| JP | 2002-14360 | 1/2002 | | JP | 2002-139734 | 5/2002 |
| JP | 2002-23176 | 1/2002 | | JP | 2002-202512 | 7/2002 |
| JP | 2002-49045 | 2/2002 | | JP | 2002-202514 | 7/2002 |
| JP | 2002-82340 | 3/2002 | | JP | 2002-214626 | 7/2002 |
| JP | 2002-90759 | 3/2002 | | KR | 2000-0035302 | 6/2000 |
| JP | 2002-90760 | 3/2002 | | | | |
| JP | 2002-107740 | 4/2002 | | | | |
| JP | 2002-122872 | 4/2002 | | | | |

* cited by examiner

APPARATUS AND METHOD FOR DISPENSING LIQUID CRYSTAL

The present application claims the benefit of Korean Patent Application No. 2002-42725 filed in Korea on Jul. 20, 2002, which is hereby incorporated by reference.

BACKGROUND OF THE INVENTION

1. Field of the Invention

The present invention relates to a liquid crystal dispensing apparatus of a LCD (liquid crystal display), and more particularly, to an apparatus and a method for dispensing liquid crystal capable of dispensing small amounts of liquid crystal accurately.

2. Discussion of the Related Art

With the rapid development of the telematique field, importance of the display industry for displaying information is correspondingly growing. Up to now, among information displays, because a CRT (cathode ray tube) can display various colors and show good screen brightness, it has been favored. However, according to a need for a large, portable, high definitional display, it has been required to develop a flat panel display instead of a CRT which has heavy weight and large volume. The flat panel display has wide and various application fields such as in airplanes and spacecraft. At present, there are a LCD (liquid crystal display), an ELD (electroluminescent display), a FED (field emission display), and a PDP (plasma display panel), etc. as a flat panel display.

In the LCD, a sealant is printed onto a color filter substrate on which a color filter and a black matrix layer are formed. A spacer is scattered onto a thin film transistor substrate on which an electrode and a thin film transistor are formed to maintain a cell gap between the two substrates. The two substrates are adhered to each other, and liquid crystal is injected therebetween.

In general, the LCD includes a TFT substrate, a color filter substrate and a liquid crystal layer formed therebetween. Data lines and gate lines are arranged lengthwise and breadthwise onto the TFT substrate to define pixel regions. A TFT (thin film transistor) is arranged on a portion at which the data line and the gate line cross each other as a switching element, and a pixel electrode is arranged on the pixel region to be connected to the TFT. In the meantime, R, G, B color filter layers for displaying colors are arranged onto the color filter substrate, and a black matrix layer is arranged to prevent light from being transmitted to the TFT, (the data line and the gate line.) An ITO (indium tin oxide) layer is arranged onto a whole surface including the black matrix layer and the color filter layer.

In the liquid crystal display apparatus, various patterns are formed onto the TFT substrate and the color filter layer, the two substrates are adhered to each other, and liquid crystal is injected. Herein, there are many methods for injecting liquid crystal. Among them, a vacuum injection is largely used where an internal space of the cells is vacuumed and liquid crystal is drawn into the cells using a pressure difference is largely used.

In more detail, the liquid crystal injection using the pressure difference after maintaining the cells at a vacuum state is performed in a vacuum chamber. First, the liquid crystal panel having the two substrates adhered with each other are arranged in the vacuum chamber. Air pressure is gradually reduced so that the internal space of the liquid crystal panel is in a low pressure state—almost a vacuum state. When the internal space of the liquid crystal panel is in the low pressure state, an injection opening is contacted to liquid crystal. Then, air is injected into the chamber so that the pressure outside the liquid crystal panel is gradually increased. Thus, a pressure difference occurs between the inside and outside of the liquid crystal panel, and accordingly, liquid crystal is injected into the liquid crystal panel.

However, in the above-described liquid crystal injection method, a significant amount of time is required to inject liquid crystal into the liquid crystal panel. In addition, staining may occur at the injection opening. Consequently, lower picture quality and loss lots of liquid crystal result.

SUMMARY OF THE INVENTION

Accordingly, the present invention is directed to an apparatus and method for dispensing liquid crystal that substantially obviates one or more of the problems due to limitations and disadvantages of the related art.

An object of the present invention is to provide an apparatus and a method for dispensing liquid crystal capable of preventing error of a liquid crystal display device by always dispensing an accurate amount of liquid crystal onto a substrate.

Another object of the present invention is to provide a liquid crystal dispensing apparatus capable of discharging an accurate amount of liquid crystal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal dispensing apparatus for dispensing liquid crystal onto a substrate comprises a frame; a table installed on the frame to have the substrate to be mounted thereon; at least one liquid crystal discharge device to adjustably discharge an amount of liquid crystal, the liquid crystal discharge device including a piston to perform ascending motions to draw in the liquid crystal and descending motions to discharge the liquid crystal with an angle of at least a portion of the liquid crystal discharge device determining a magnitude of the ascending/descending motion to control an amount of liquid crystal discharged; and a liquid crystal amount inspecting portion to inspect a liquid crystal dispensing amount by comparing an actual amount of liquid crystal discharged from the liquid crystal discharge device with a preset liquid crystal amount.

In another aspect, a liquid crystal dispensing method, comprises the steps of calculating a liquid crystal dispensing amount by comparing an actual amount of liquid crystal dispensed from a liquid crystal discharge device with a preset liquid crystal amount, the liquid crystal discharge device including a piston to perform ascending motions to draw in the liquid crystal and descending motions to discharge the liquid crystal with an angle of at least a portion of the liquid crystal discharge device determining a magnitude of the ascending/descending motion to control an amount of liquid crystal discharged; adjusting the liquid crystal dispensing amount to be substantially equal to the preset liquid crystal amount by adjusting the angle; moving a substrate mounted on a table relative to liquid crystal discharge device so that the liquid crystal discharge device is positioned relative to an initial dispensing position; descending the liquid crystal discharge device to a first set distance above the substrate; dispensing the liquid crystal dispensing amount onto the substrate; ascending the liquid crystal discharge device to a second set distance above the substrate; and removing the substrate from the table.

In another aspect, a liquid crystal dispensing method comprises the steps of calculating a liquid crystal dispensing amount by comparing an actual amount of liquid crystal dispensed from a liquid crystal discharge device with a preset liquid crystal amount, the liquid crystal discharge device having a piston to perform a pumping action; moving a substrate mounted on a table relative to liquid crystal discharge device so that the liquid crystal discharge device is positioned relative to an initial dispensing position; descending the liquid crystal discharge device to a first set distance above the substrate; dispensing the liquid crystal dispensing amount onto the substrate by performing a pumping with the piston; ascending the liquid crystal discharge device to a second set distance above the substrate; and unloading the substrate from the table.

In another aspect, a liquid crystal discharging device comprises a syringe to contain liquid crystal; a cylinder having a liquid crystal suction hole for drawing in the liquid crystal from the syringe and a liquid crystal discharge hole for discharging the liquid crystal; a piston inserted into the cylinder to perform rotation and ascending/descending motions and having a suction-discharge groove at the outer circumference thereof to draw the liquid crystal through the suction hole and to discharge the liquid crystal through the discharge hole; a connection unit to guide the liquid crystal discharged through the discharge hole of the piston; and a nozzle to dispense the liquid crystal received from the connection unit onto the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
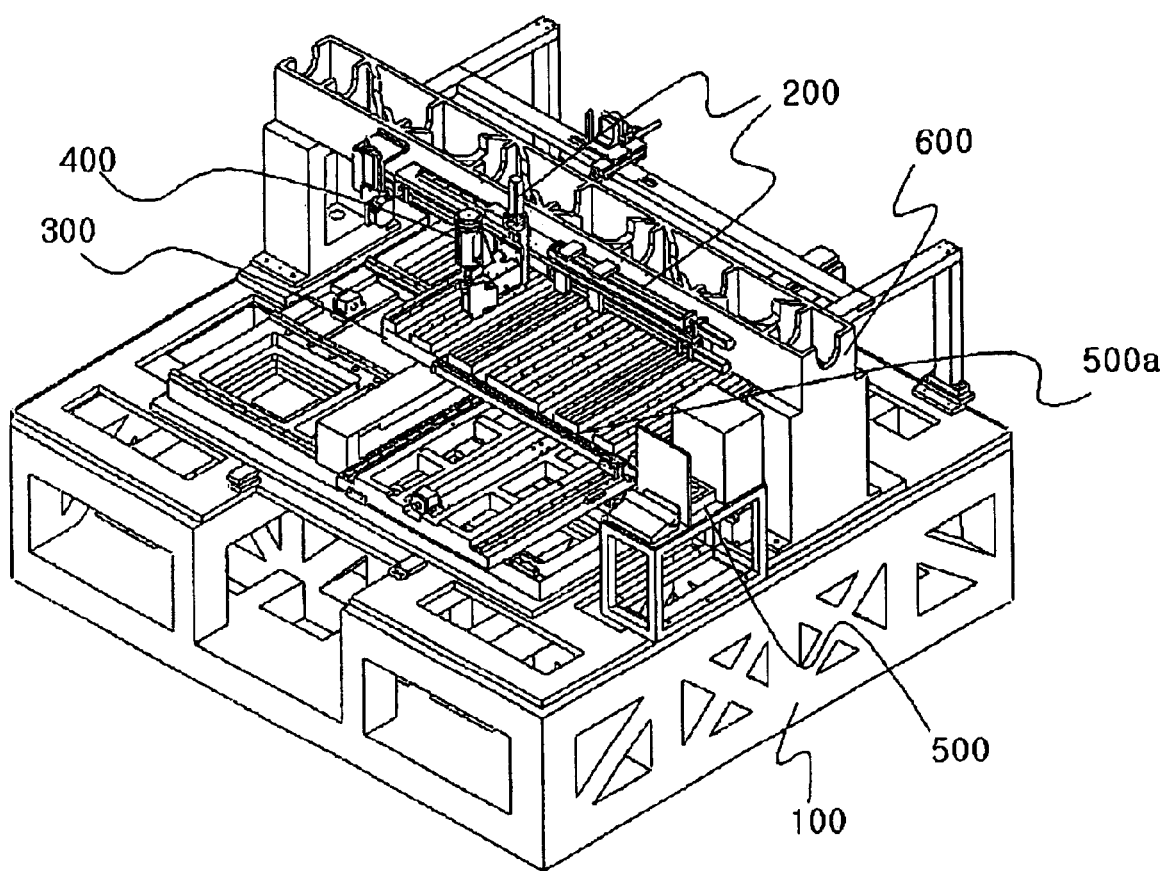
FIG. 1 is a perspective view illustrating a liquid crystal dispensing apparatus in accordance with the present invention.
Figure 2:
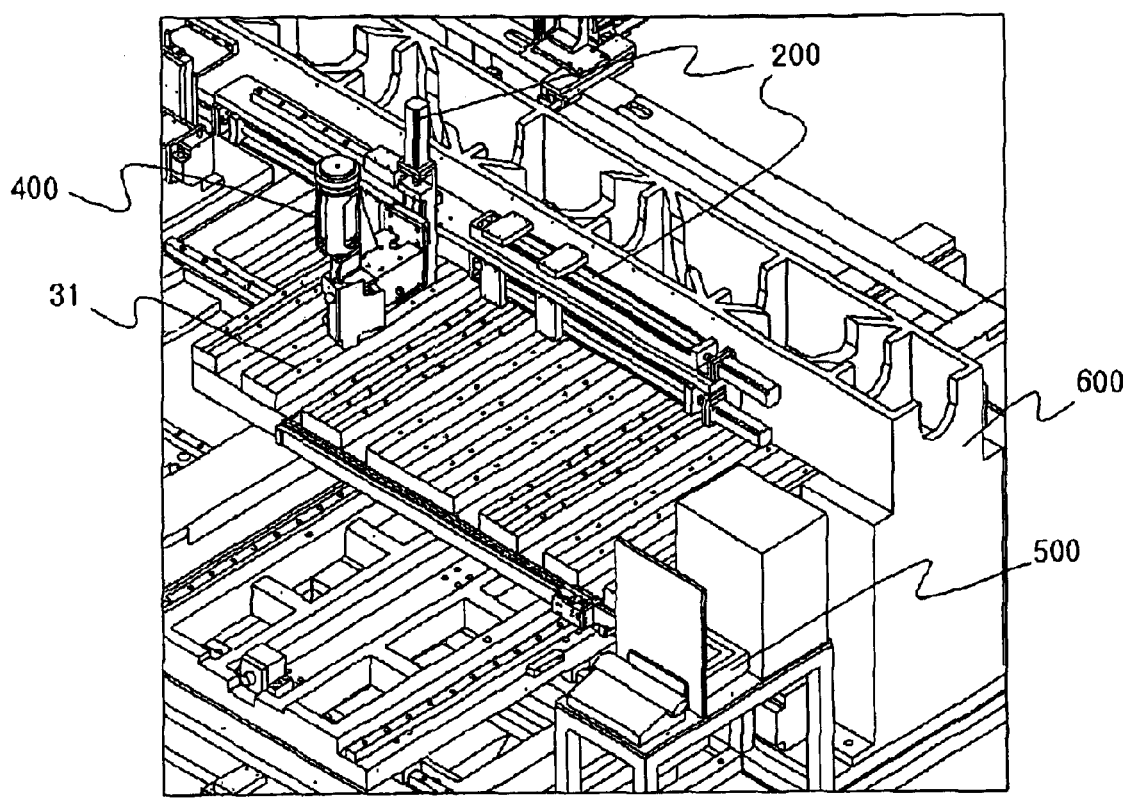
FIG. 2 is a partial-enlarged view illustrating the apparatus in FIG. 1.
Figure 3:
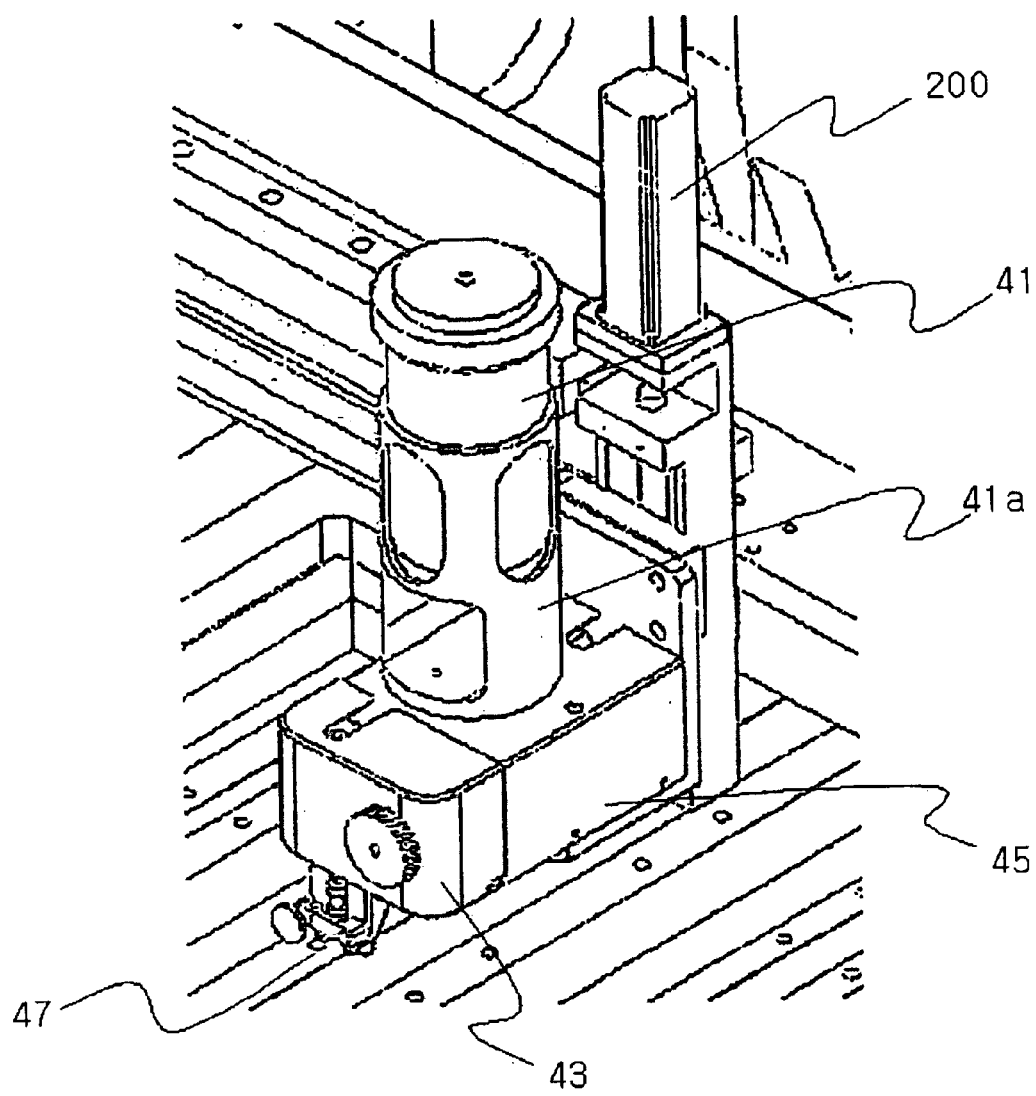
FIG. 3 is a perspective view illustrating a liquid crystal discharging device of the apparatus in FIG. 1.
Figure 4:
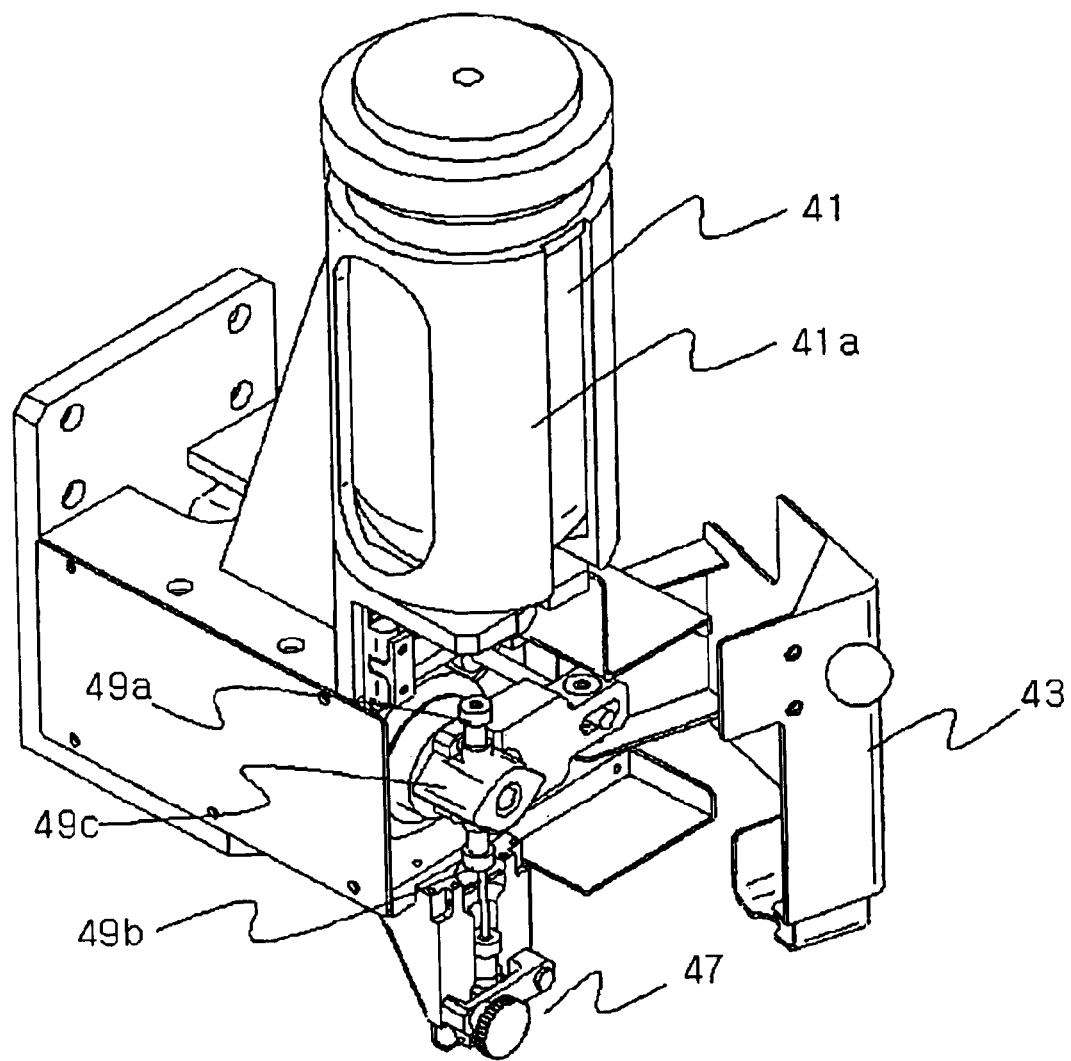
FIG. 4 is a perspective view illustrating the liquid crystal discharging device.
Figure 5:
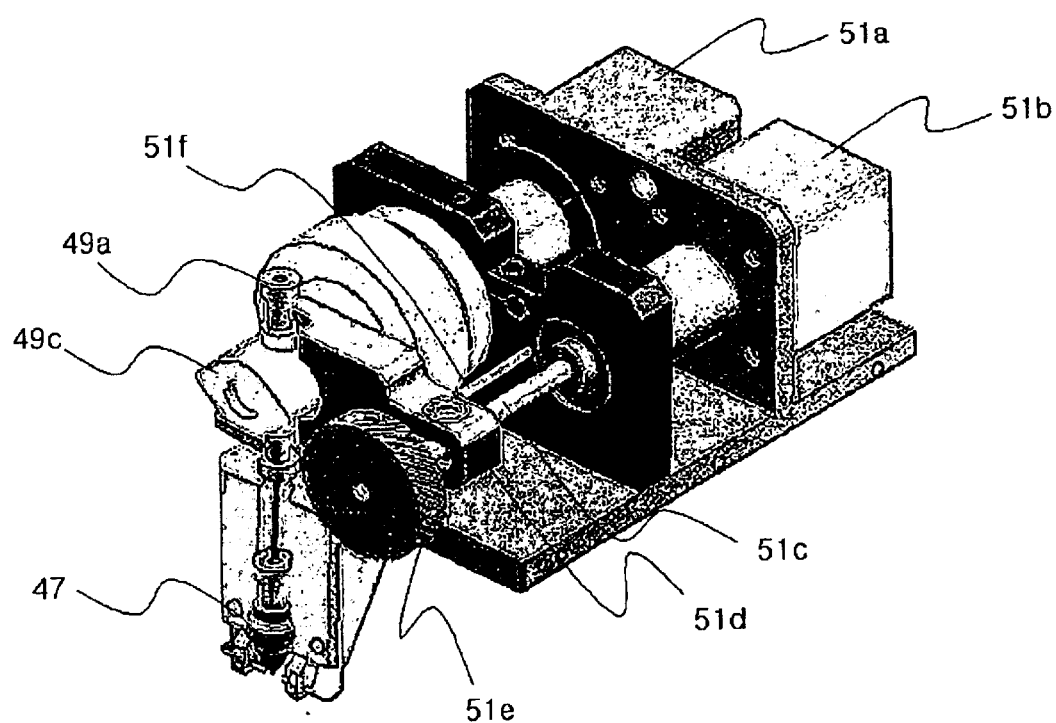
FIG. 5 is a partial-enlarged view illustrating the liquid crystal discharging device in FIG. 4.

FIG. 1 is a perspective view illustrating a liquid crystal dispensing apparatus in accordance with the present invention, FIG. 2 is a partial-enlarged view illustrating the apparatus in FIG. 1, FIG. 3 is a perspective view illustrating a liquid crystal discharging device of the apparatus in FIG. 1, FIG. 4 is a perspective view illustrating the liquid crystal discharging device, and FIG. 5 is a partial-enlarged view illustrating the liquid crystal discharging device in FIG. 4.

First, as depicted in FIG. 1, the liquid crystal dispensing apparatus in accordance with the present invention includes a frame 100, a transfer means 200, a table 300, a liquid crystal discharging device 400, and liquid crystal amount inspection means 500, 500*a*.

Herein, the frame 100 is a lower structure of the liquid crystal dispensing apparatus, and the table 300 and the liquid crystal amount inspection means 500 are arranged thereon. The transfer means 200 is arranged on the frame 100. The frame 100 has a space for taking a substrate in/out of the table 300 by a robot arm, and a supporter 600 is arranged to traverse the frame 100.

A substrate loaded by the robot arm is mounted onto the table 300. Because plural suction holes 31 (shown in FIG. 2) are provided on the surface of the table 300, the substrate is vacuumed-absorbed and fixed.

As depicted in FIG. 3, the liquid crystal discharge device 400 includes a syringe unit 41 in which liquid crystal is contained, a syringe receiver 41*a* for receiving and supporting the syringe unit 41, a liquid crystal discharging portion (not shown) for receiving liquid crystal from the syringe unit 41 and discharging a specific amount of liquid crystal, a liquid crystal discharging portion protection cap 43 for surrounding the liquid crystal discharging portion, a liquid crystal amount adjustment unit (not shown) for adjusting a amount of the liquid crystal discharged from the liquid crystal discharging portion, a liquid crystal amount adjustment unit protection cap 45 for surrounding the liquid crystal amount adjustment unit, and a nozzle unit 47 for receiving liquid crystal from the liquid crystal discharging portion and dispensing the liquid crystal onto the substrate.

As depicted in FIG. 4, the liquid crystal discharging portion includes a cylinder 49*c* having a liquid crystal suction hole 49*a* and a liquid crystal discharge hole 49*b*, and having liquid crystal capacity varied according to an angle. The liquid crystal discharging portion further includes a piston (not shown) for opening/closing the suction hole 49*a* and the discharge hole 49*b* selectively by performing a rotation motion in the cylinder 49*c*, thereby discharging liquid crystal drawn (or sucked) from the suction hole 49a to the discharge hole 49b by performing an ascending/descending motion.

As depicted in FIG. 5, the liquid crystal amount adjustment unit includes a first servo motor 51a for providing a driving force of the rotation motion and the ascending/descending motion of the piston (not shown), a second servo motor 51b for providing a driving force for controlling an angle of the cylinder 49c, a rotational shaft 51c connected to the second servo motor 51b and having a screw thread on the surface, a capacity adjustment bracket 51d in which a side is inserted onto the rotational shaft 51c, the other side is combined with the cylinder 49c, the portion inserted into the rotational shaft 51c moves forward/backward along the screw thread according to the rotation of the rotational shaft 51c, the portion combined with the cylinder 49c adjusts capacity of liquid crystal drawn into the cylinder 49c by the angular variation of the cylinder 49c in accordance with applied force, and a manual lever 51e connected to the end of the rotational shaft 51c to allow a user to manually adjust the forward/backward movement of the capacity adjustment bracket 51d. Herein, the piston (not shown) can perform the rotation and up/down motions regardless of an angle of the cylinder 49c.

The first and second servo motors 51a, 51b are connected to a central control unit (not shown) controlling the whole liquid crystal dispensing apparatus by wire or wireless. Because the central control unit controls the first and second servo motors 51a, 51b, a rotational speed and ascending/descending speed of the piston (not shown) and an angle of the cylinder 49c are controlled automatically.

In the meantime, the liquid crystal capacity adjustment unit includes a LVDT (linear variable differential transformer) 51f for measuring a displacement of the capacity adjustment bracket 51d. The LVDT 51f measures a displacement of the capacity adjustment bracket 51d and transmits it to the central control unit (not shown).

In more detail, an angular variation of the cylinder 49c is determined according to the forward/backward movement range of the capacity adjustment bracket 51d. Accordingly, a capacity of liquid crystal drawn into the cylinder 49c is varied. Thus, if it is possible to measure a displacement of the capacity adjustment bracket 51d, present capacity of the cylinder 49c can be known. Therefore, capacity of the cylinder 49c can be adjusted by adjusting a forward/backward movement range of the capacity adjustment bracket 51d.

Figure 6A:
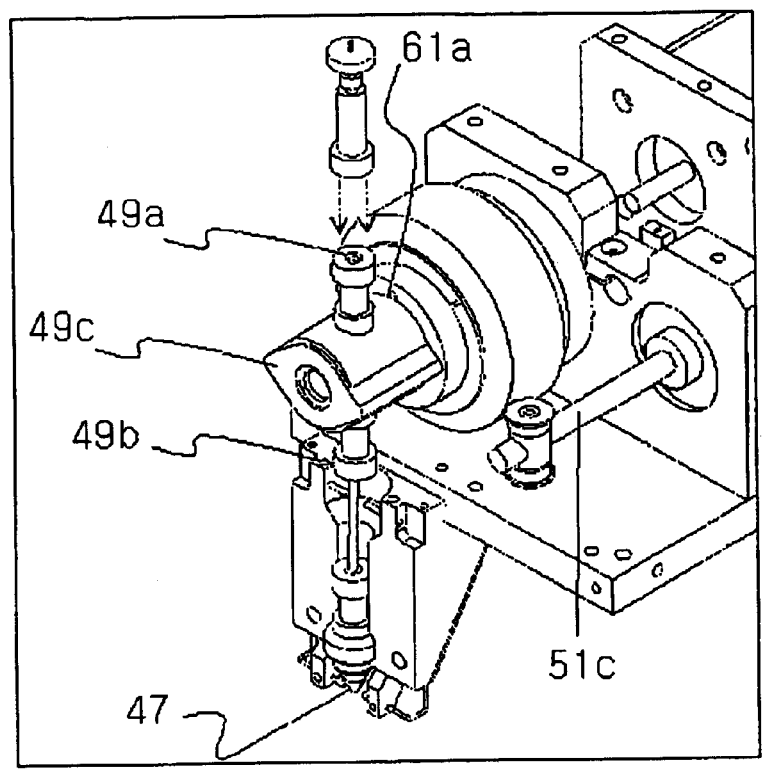
FIGS. 6A and 6A are exploded perspective views illustrating the liquid crystal discharging device in accordance with the present invention.
Figure 6B:
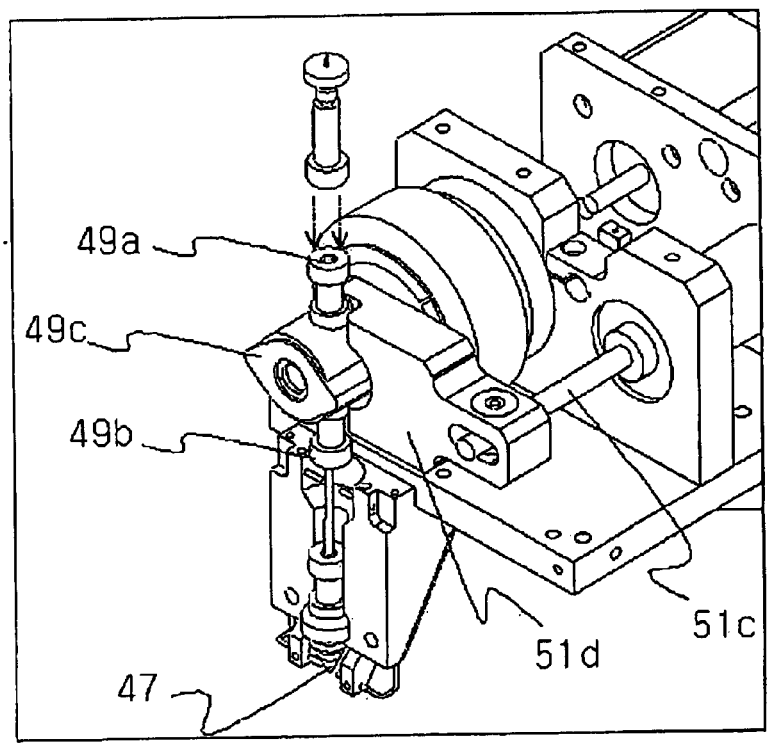

In the meantime, FIG. 6A is an exploded perspective view illustrating the liquid crystal discharging device in accordance with the present invention. It shows before the capacity adjustment bracket 51d is combined with the cylinder 49c. FIG. 6B is an exploded perspective view illustrating the liquid crystal discharging device in accordance with the present invention. It shows the capacity adjustment bracket 51d for adjusting capacity by varying an angle of the cylinder 49c is combined with the cylinder 49c. In FIG. 6A, a groove 61a is provided for a screw to connect the capacity adjustment bracket 51d with the cylinder 49c.

Hereinafter, the variation relation between the movement of the capacity adjustment bracket 51 and the angular variation of the cylinder 49c will be described in more detail.

Figure 7A:
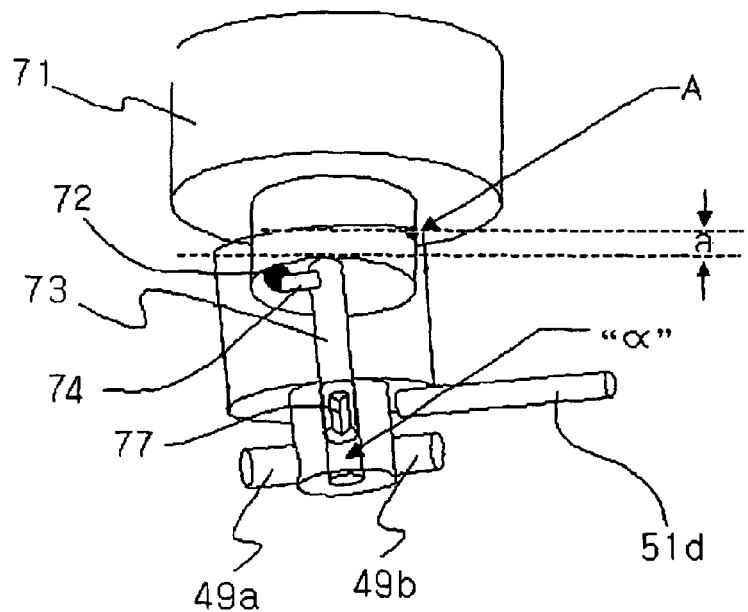
FIGS. 7A and 7B are state diagrams illustrating capacity variation of a cylinder of the liquid crystal dispensing apparatus in accordance with the present invention.
Figure 7B:
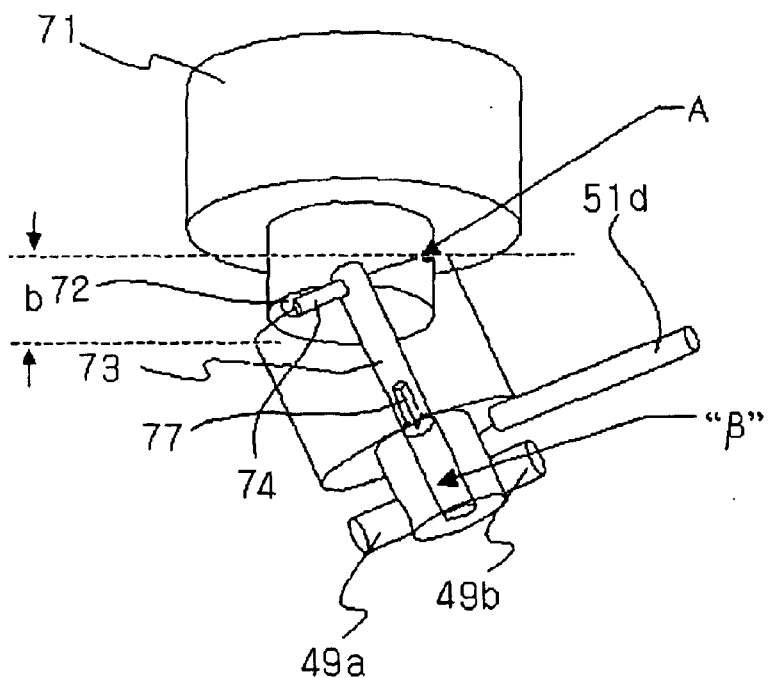

FIGS. 7A and 7B illustrate the capacity variation state of the cylinder 49c according to an angular variation thereof by the capacity adjustment bracket 51d. FIG. 7A shows before the capacity of the cylinder is adjusted. FIG. 7B shows the capacity of the cylinder is varied by adjusting the capacity adjustment bracket 45d.

First, as depicted in FIG. 7A, part ("A") of the upper portion of the cylinder 49c is rotationally connected to a body 71 which rotates about a fixed axis, a piston 73 is installed in the cylinder 43c and performs the rotation motion while performing the up/down motion, liquid crystal is drawn into the cylinder 49c through the suction hole 49a by the motions of the piston 73, and the liquid crystal is discharged through the discharge hole 49b and is transmitted to the nozzle unit 47 in FIGS. 6A and 6B. Herein, a suction/discharge groove (not shown) is formed at the lower end of the piston to draw liquid crystal when the suction hole 49a is open and discharge liquid crystal when the discharge hole 49b is open.

In FIG. 7A, the body 71 includes a hole 72. Thus, upon rotation of the body 71, the hole 72 defines a plane. The end of an arm 74 of the piston 73 is inserted into the hole to mate the piston 73 with the body 71. Accordingly, the end of the arm 74 is fixed to the plane defined the rotation of the hole 72. Since the piston 73 and the arm 74 are disposed at a non-zero angle the arm 74 pushes/pulls the piston up and down to effect an ascending/descending motion of the piston. Moreover, if the angle of the piston 73 is increased, the magnitude of the ascending/descending motion is correspondingly increased, as shown in FIG. 7B. It can also be recognized that if the piston 73 is disposed along the rotation of axis of the body 71 (i.e., an angle of zero), the arm 74 is a radius of the path defined by the hole 72, and there will be no ascending/descending motion.

The nozzle unit 47 in FIGS. 6A and 6B dispenses liquid crystal onto the substrate (not shown). When a liquid crystal amount dispensed from the nozzle unit 47 is smaller than a preset liquid crystal amount in comparison, there is a need to increase a amount of liquid crystal discharged from the cylinder 49c. For that, because a liquid crystal capacity of the cylinder 49c has to be increased, an angular variation of the cylinder 49c has to be increased to draw more liquid crystal into the cylinder 49c through the suction hole 49a. Accordingly, the rotational shaft 51c is rotated by controlling the second servo motor 51b, and the capacity adjustment bracket 51d inserted into the rotational shaft 51c is moved toward a direction increasing the angular variation of the cylinder 49c.

In more detail, as depicted in FIG. 7B, the capacity adjustment bracket 51d is combined-fixed to the upper portion of the cylinder 49c, and the upper portion of the cylinder 49c is rotationally combined with the fixed body 71. When the capacity adjustment bracket 51d is moved toward the second servo motor 51b, the angular variation of the cylinder 49c is increased so that a liquid crystal capacity of the cylinder 43c is increased from "α" to "β." Accordingly, an amount of liquid crystal drawn through the suction hole 49a is increased.

Herein, the increased amount of liquid crystal is determined by the angular variation increase of the cylinder 49c, wherein an angle of the cylinder 49c has to be adjusted appropriately by corresponding to a amount of liquid crystal to be increased. Therefore, liquid crystal amount variation according to an angular variation of the cylinder 49c through many tests is stored in a memory, and the central control unit adjusts referring to the stored data.

Figure 8:
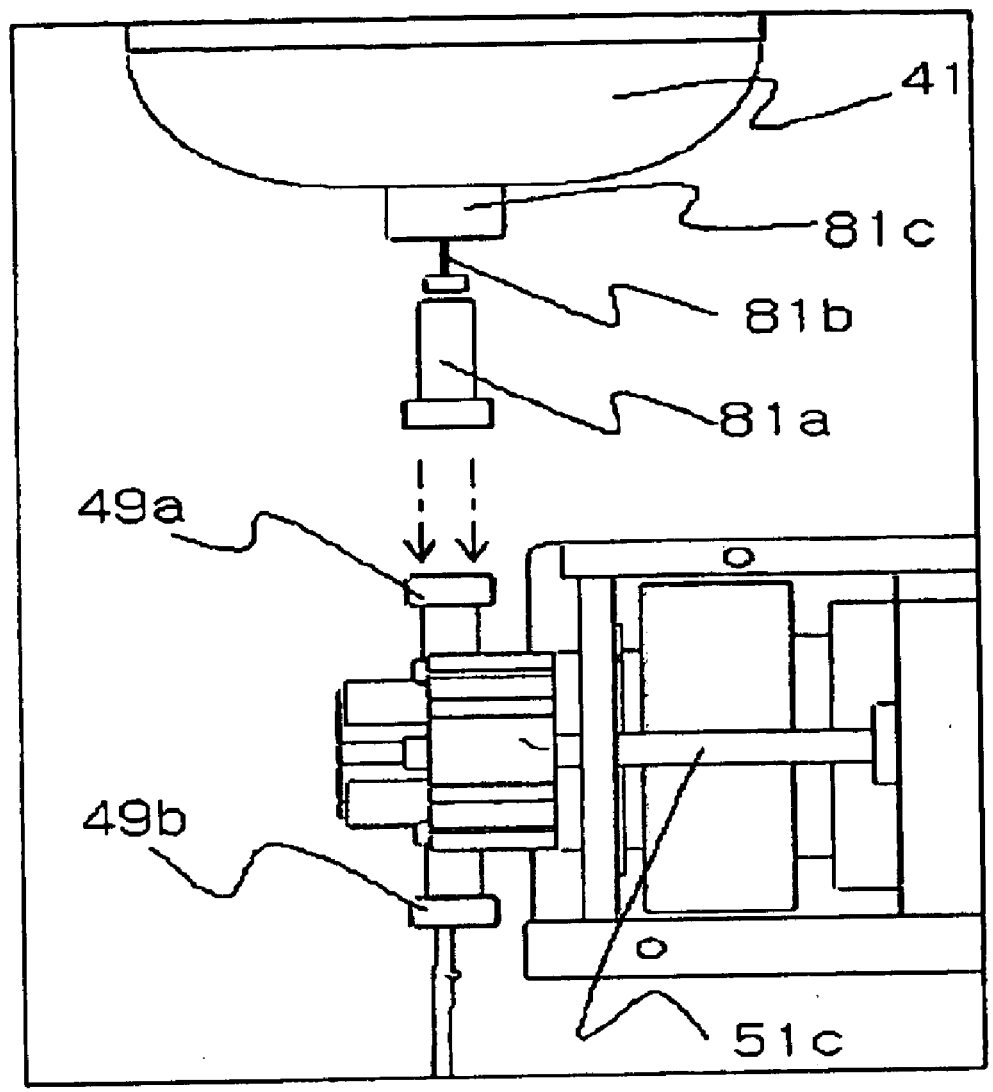
FIG. 8 is a side view illustrating a connection structure of a cylinder portion and a liquid crystal discharge portion of the liquid crystal dispensing apparatus in accordance with the present invention.

In the meantime, as depicted in FIG. 8, the liquid crystal suction hole 49a receives liquid crystal through a connection pipe 81a of the cylinder unit 41, a pin 81b as an injector needle connected to a side of the connection pipe 81a, and a pad 81c of a silicone or butyl rubber group having strong closing characteristics installed at the end of the cylinder unit 41. Accordingly, because the syringe unit 41 and the liquid crystal suction hole 49a has a combining structure similar to a combining structure of a Ringer's bottle and tube, it is easy to attach/detach the liquid crystal suction hole 49a and the syringe unit 41 with each other, and it is possible to reduce the number of combining parts.

In the meantime, as depicted in FIG. 1, the liquid crystal amount inspection portion includes an electronic scale 500, a measuring cup (not shown) mounted onto a support fixed to the front end of the table 300, and a transport arm 500a for transporting the measuring cup onto the electronic scale 500. For liquid crystal amount inspection, the measuring cup is arranged at the lower portion of the liquid crystal discharge device 400 by transporting the table 300, and the liquid crystal is dispensed into the measuring cup.

Afterward, when the transport arm 500a transports the measuring cup onto the electronic scale 500, the electronic scale 500 measures an amount of liquid crystal contained in the measuring cup and transmits the data to the central control unit. The central control unit inspects it by comparing the amount of liquid crystal discharged from the liquid crystal discharge device 400 with the presently desired amount of liquid crystal.

Figure 9:
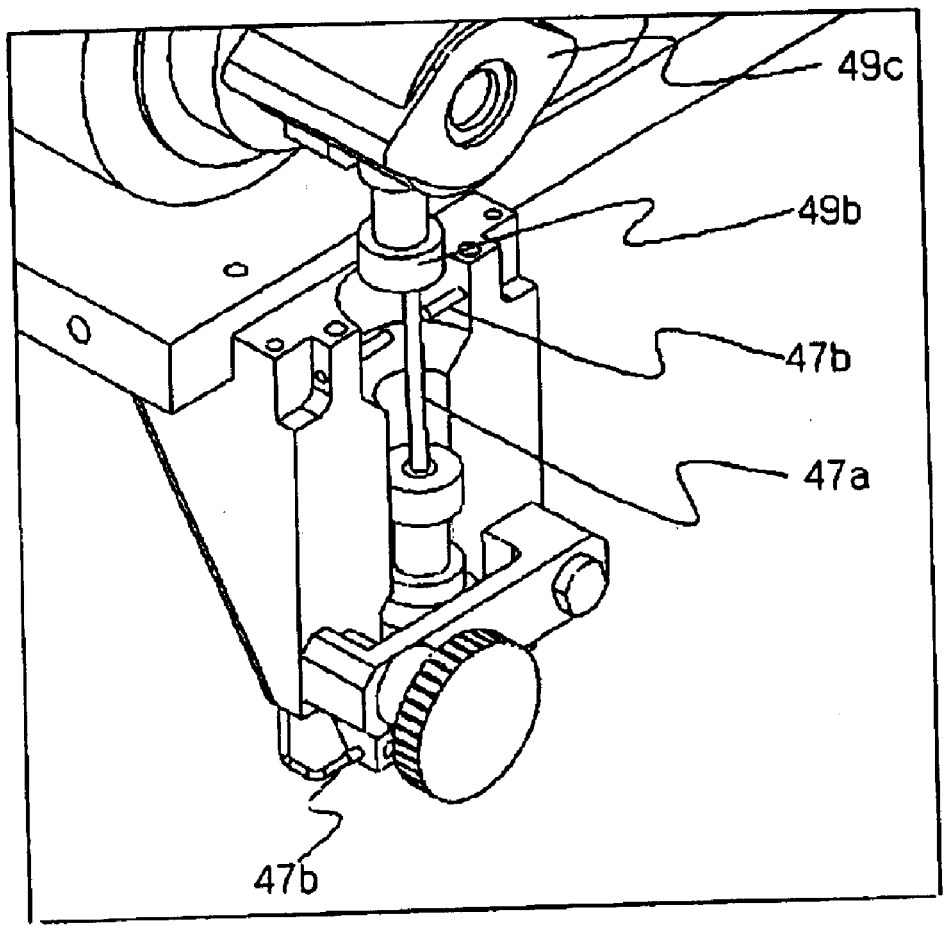
FIG. 9 is a perspective view illustrating a construction of a nozzle portion of the liquid crystal dispensing apparatus in accordance with the present invention.

In the meantime, as depicted in FIG. 9, the nozzle unit 47 in FIGS. 6A and 6B is connected to the liquid crystal discharge unit through a tube 47a and finally dispenses the liquid crystal supplied from the liquid crystal discharge unit onto the substrate. The end of the nozzle unit 47 is coated by Teflon, and a sensor 47b for sensing air bubbles and liquid crystal-forming is respectively installed at the both ends of the tube 47a and the nozzle unit 47. Herein, the sensor 47b is an optical sensor. In the sensor 47b, a light transmitting portion is installed at a side, and a light receiving portion is formed at the opposite side to detect air bubble occurrences.

Figure 10A:
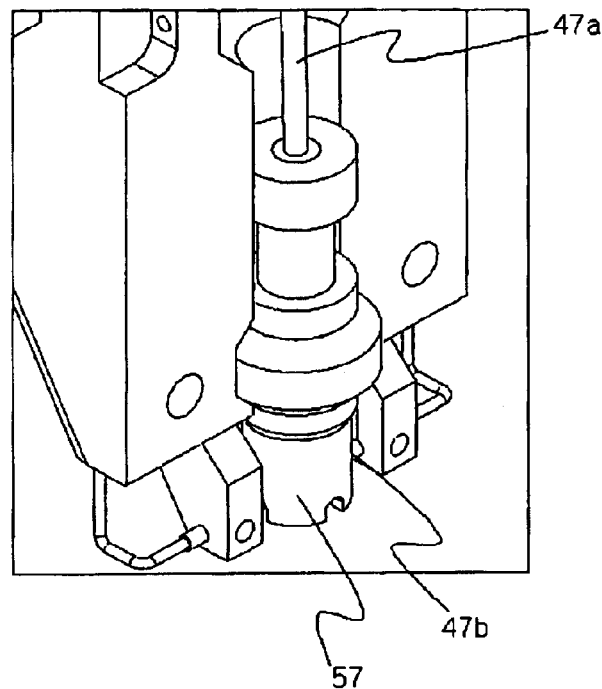
FIGS. 10A and 10B are perspective views illustrating an assembly state of a nozzle protection cap of the liquid crystal dispensing apparatus in accordance with the present invention.
Figure 10B:
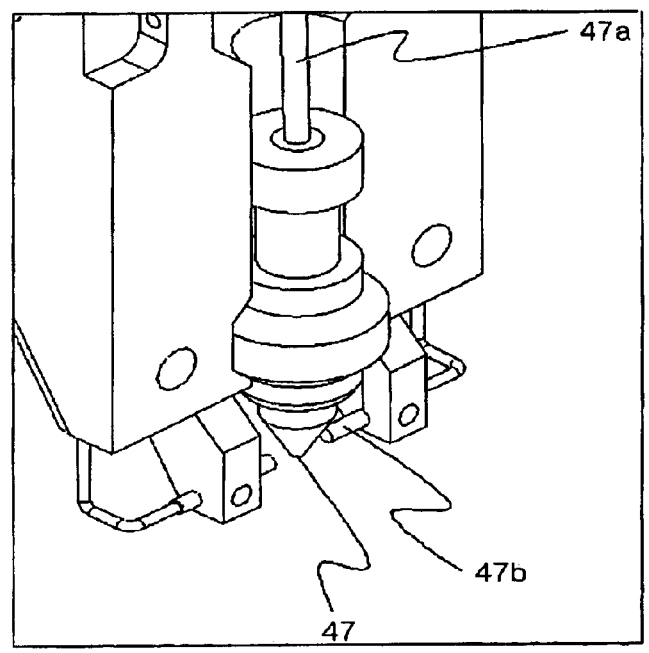

In addition, as depicted in FIG. 10A, the nozzle unit 47 further includes a nozzle unit protection cap 57. FIG. 10A shows the nozzle unit 47 after the nozzle unit protection cap 57 is installed, and FIG. 10B shows the nozzle unit 47 before the nozzle unit protection cap 57 is installed. When the nozzle unit protection cap 57 is installed, it is possible to dispense liquid crystal onto the substrate stably and prevent liquid crystal from being splashed.

The operation of the liquid crystal dispensing apparatus in accordance with the present invention will be described.

First, the table 300 is moved to a position in which the substrate can be received.

Afterward, the robot arm lifts up the substrate on the Inline and loads it onto the table 300. Herein, a section of the table 300 shows an unevenness shape, the robot arm is installed at the rear of the liquid crystal dispensing apparatus and loads the substrate through a space between the support 400 and the frame 100. Herein, plural absorption holes 31 are formed at the surface of the table 300 to vacuum-absorb the substrate. Accordingly the substrate loaded onto the table 300 is fixed to the table 300.

After the substrate is fixed to the table 300, the table 300 is moved to a start point of a dispensing pattern to perform liquid crystal dispensing. A liquid crystal dispensing position is programmed, and it is possible to change a dispensing position according to the program. In the program, moving positions of the table 300 is pre-determined which is generally described by a matrix. When a central point of the table 300 coincides with a position of the nozzle unit 47, a dispensing point can be determined using orthogonal coordinates.

Afterward, the liquid crystal discharge device 400 descends to dispense liquid crystal. In general, plural (for example, five) liquid crystal discharge devices 400 are installed at the transport system 200, and the ascending and descending of the liquid crystal discharge devices 400 is controlled using the servo motor (not shown) proceeding, for example, at 0.5 μm (micrometer) per 1 pulse. Accordingly, it is possible to adjust a distance between the end of the nozzle unit 47 and the substrate appropriately.

In more detail, when a distance between the end of the nozzle unit 47 and the substrate is too far away, liquid crystal may be splashed during dispensing. On the contrary, when a distance between the end of the nozzle unit 47 and the substrate is too near, the dispensed liquid crystal might contact the end of the nozzle unit 47. Accordingly, an appropriate height setting is required.

In the meantime, liquid crystal discharge mechanism of the liquid crystal discharge device 400 is similar to a four-phase organ. For example, when a motor ¼-rotates from a reference point, the piston rises, the suction hole 49a is open, the discharge hole 49b is closed, and liquid crystal is drawn into the cylinder 49c through the suction hole 49a. In ²⁄₄ rotation, the suction hole 49a and the discharge hole 49b of the cylinder 49c are closed by the piston. In ¾ rotation, the piston 73 in the cylinder 49c descends, the discharge hole 49b is open, the suction hole 49a is closed, and liquid crystal drawn inside the cylinder 49c is discharged to the nozzle unit 47 through the discharge hole 49b. In the final ⁴⁄₄ rotation, the suction hole 49a and the discharge hole 49b are closed again by the piston. Herein, the suction and discharge of liquid crystal by the rotation and ascending/descending motion of the piston 73 is determined by the first servo motor 51a operated by the control of the central control unit, and an amount of liquid crystal discharged is determined by the second servo motor 51b.

In more detail, the second servo motor 51b is used in the liquid crystal discharge amount control under the control of the central control unit, and an amount of liquid crystal discharged from the liquid crystal discharge unit to the nozzle unit 47 is determined by the second servo motor 51b. Herein, the central control unit calculates a relation between the seconds servo motor 51a and a liquid crystal discharge amount using a measure of the LVDT.

When the liquid crystal dispensing onto the substrate is finished through the above-mentioned processes, the liquid crystal discharge device 400 is ascended to a set position, vacuum pressure of the absorption hole 31 formed on the surface of the table 300 is removed, the substrate is separated from the table 300, and the robot arm raises the substrate and loads the substrate outside of the liquid crystal dispensing apparatus.

Hereinafter, a liquid crystal dispensing method of the liquid crystal dispensing apparatus will be described in detail.

Figure 11:
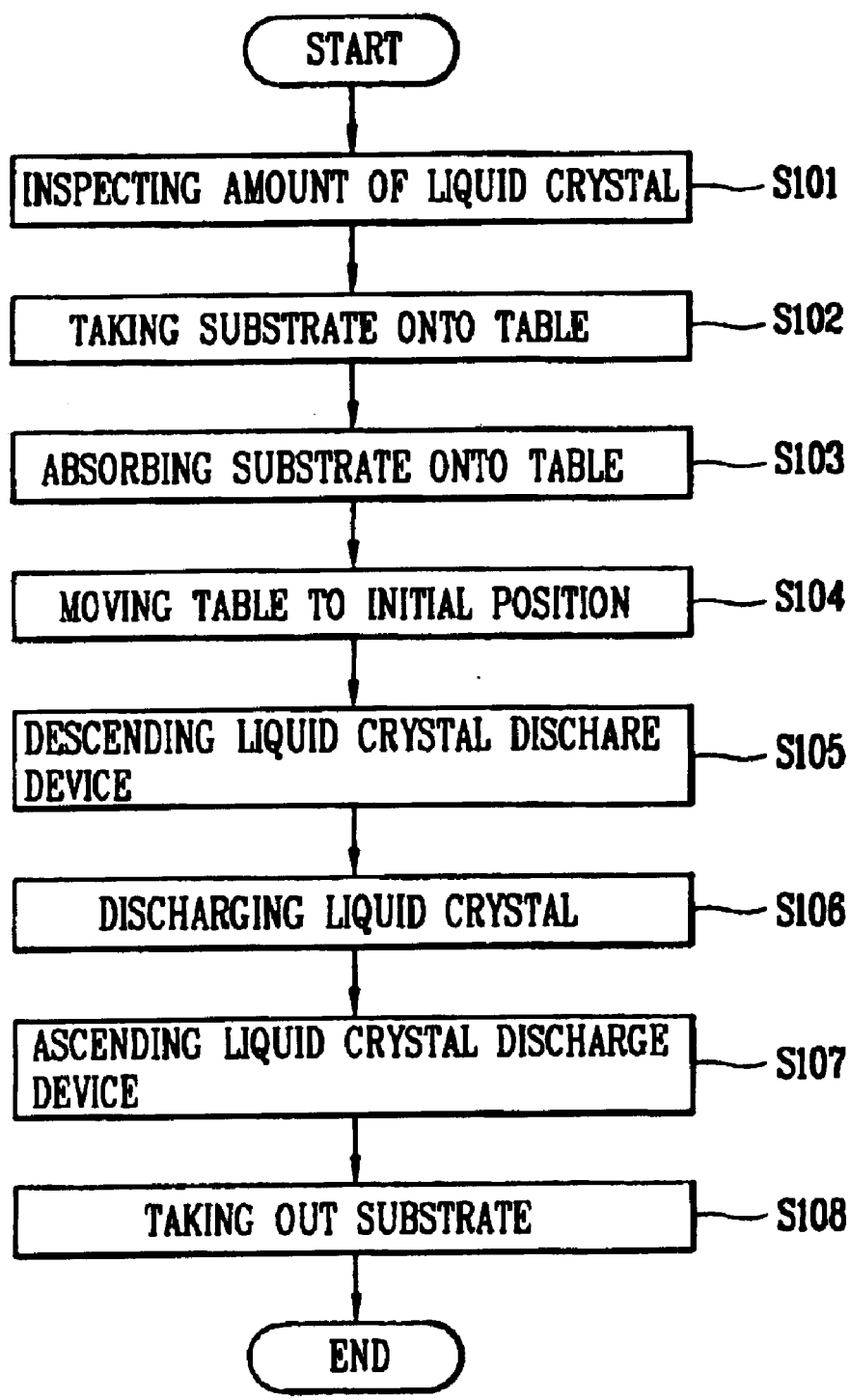
FIGS. 11 to 13 are flow charts illustrating a liquid crystal dispensing method using the liquid crystal dispensing apparatus in accordance with the present invention.

FIG. 11 is a flow chart illustrating the liquid crystal dispensing method in accordance with the present invention. The method includes an inspecting step S101 for inspecting an amount of liquid crystal to be dispensed, a taking-in step S102 for taking the substrate onto the table 300, an absorbing step S103 for absorbing the substrate onto the table 300, a moving step S104 for moving the table 300 to an initial position for liquid crystal dispensing, a descending step S105 for descending the liquid crystal discharge device 400 to a certain position above the substrate, a dispensing step S106 for dispensing liquid crystal by corresponding to a programmed liquid crystal dispensing position, an ascending step S107 for ascending the liquid crystal discharge device 400 to a certain position, and a taking-out step S108 for taking the substrate out of the table 300.

Figure 12:
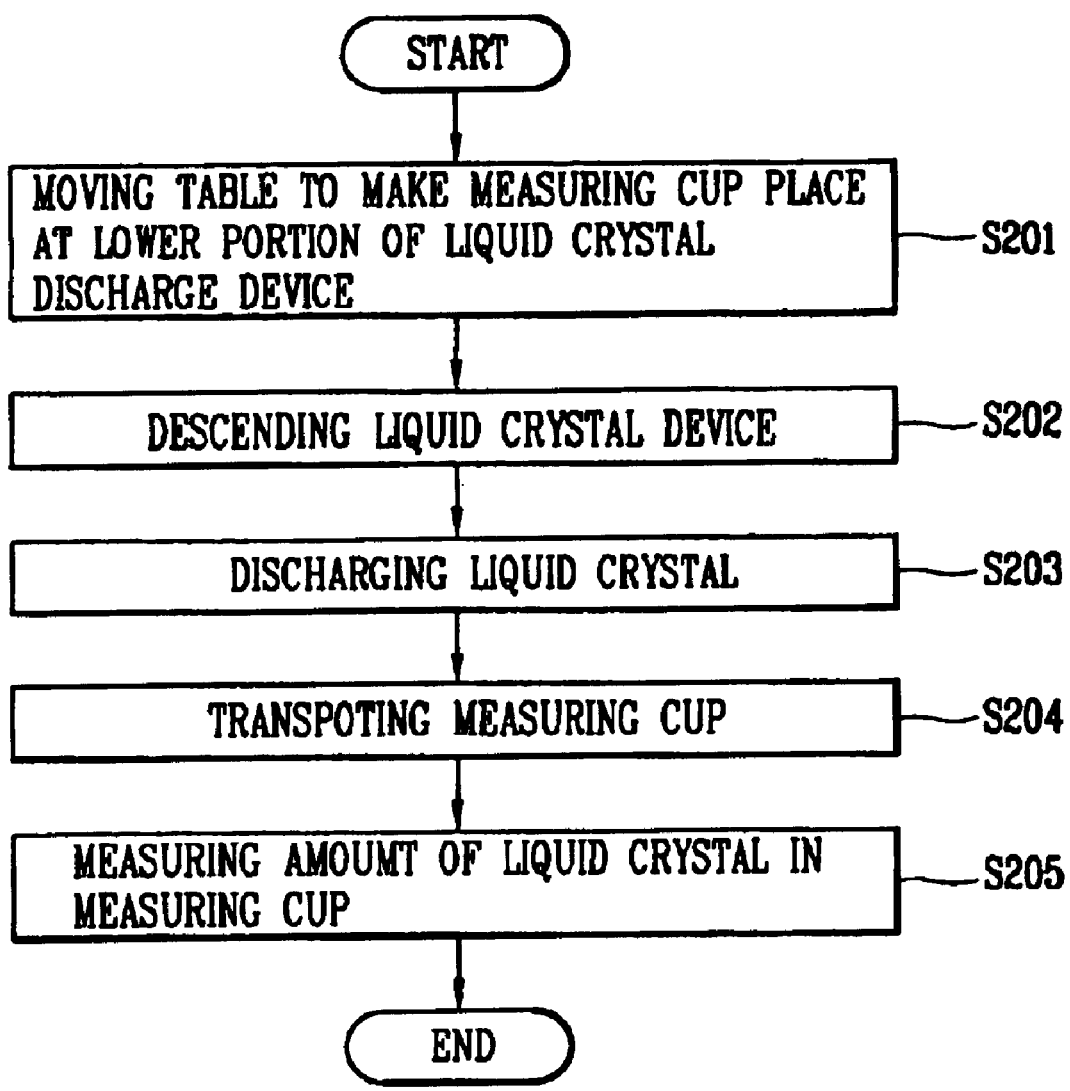

Herein, as depicted in FIG. 12, the liquid crystal amount inspecting step S101 includes a moving step S201 for moving the table 300 to place the measuring cup place at the lower portion of the liquid crystal discharge device 400, a descending step S202 for descending the liquid crystal discharge device 400 to a certain position, a dispensing step for dispensing the liquid crystal, a transporting step S204 for transporting the measuring cup containing the dispensed liquid crystal to the electric scale 500 using the transport arm, and a measuring step S205 for measuring an amount of the liquid crystal contained in the measuring cup.

Herein, when the liquid crystal amount measured by the electronic scale 500 coincides with the preset liquid crystal amount to be dispensed, the taking-in step S102 for taking the substrate onto the table 300 is performed. When the liquid crystal amount measured by the electronic scale 500 does not coincide with the preset liquid crystal amount, a step for adjusting a amount of the liquid crystal dispensed from the liquid crystal discharge device 400 is performed.

Figure 13:
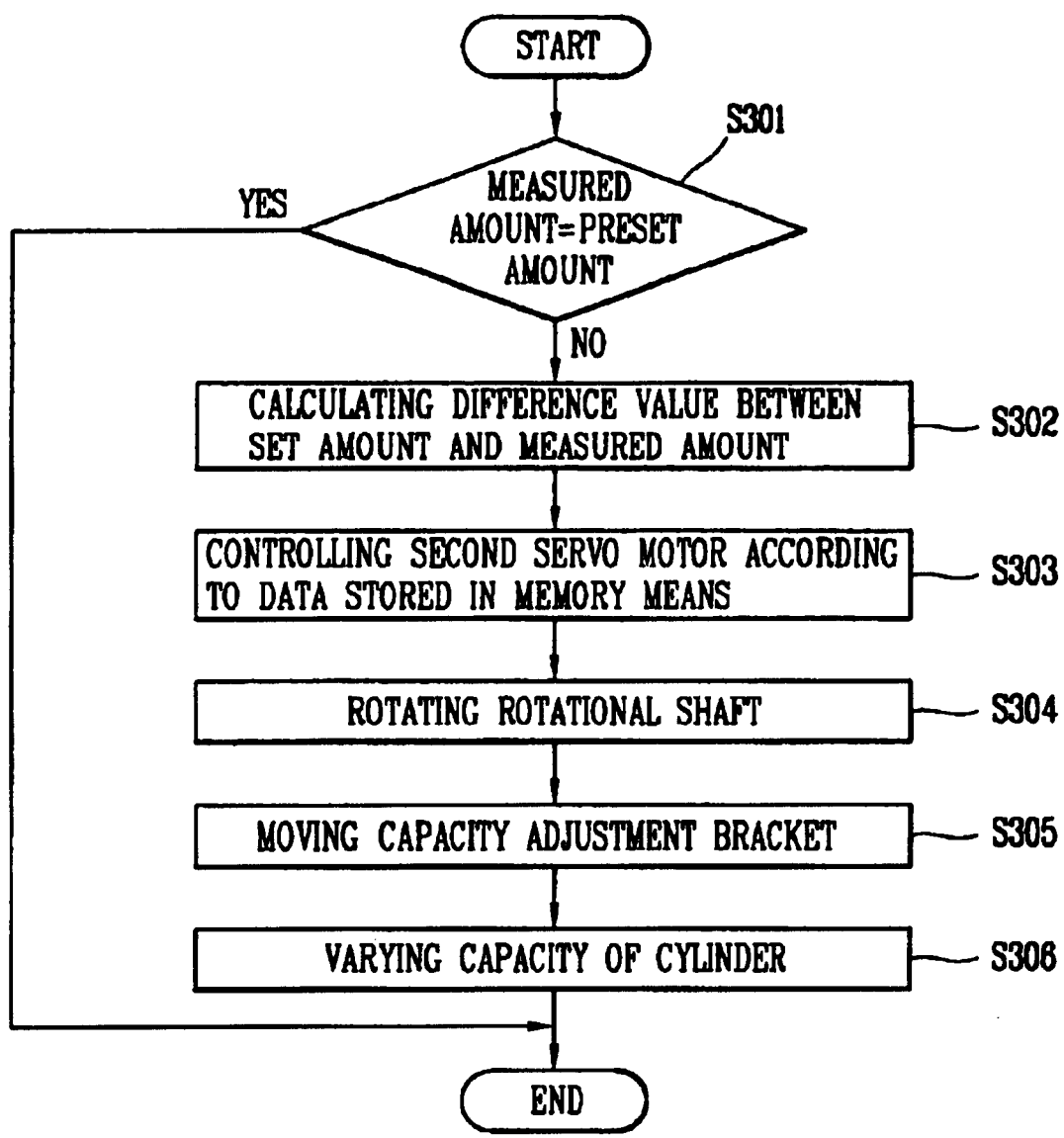

In more detail, as depicted in FIG. 13, an amount of the liquid crystal discharge from the liquid crystal discharge device 400 is measured by the electronic scale 500, and it is checked whether the measured amount is the same as the preset liquid crystal amount as shown at step S301. When they are not the same, a difference between the set amount and the measured amount is calculated, as shown at step S302.

Herein, a control value of the second servo motor 51b according to the difference value is stored in the memory means (not shown), and the central control unit controls the second servo motor 51b to make an amount of the liquid crystal discharged from the liquid crystal discharge device 400 the same with the set amount with reference to the control value stored in the memory, as shown at step S303.

As described above, the central control unit judges whether the measured amount is large or small, and controls the second servo motor 51b according to the judgement result. Accordingly, the rotational shaft 51c connected to the second servo motor 51b is rotated toward left or right according to great and small measures, as shown at step S304.

Accordingly, the capacity adjustment bracket 51d inserted into the rotational shaft 51c is moved forward or backward according to the rotation direction of the rotational shaft 51c, as shown at step S305, such that an angular variation of the cylinder 49c connected to the other side of the capacity adjustment bracket 51d is increased or decreased. Accordingly, a capacity of the cylinder 49c is varied to increase and decrease of the angle, as shown at step S306.

For example, when an amount of the liquid crystal discharged from the liquid crystal discharge device 400 is greater than a preset liquid crystal amount, a present capacity of the cylinder 49x can draw liquid crystal greater than a capacity corresponding to a reference value. Hence, the central control unit controls the second servo motor 51b to decrease an angle of the cylinder 49c with reference to data stored in the memory to make the cylinder 49c have a capacity corresponding to the set amount.

Herein, when the rotational shaft 51c connected to the second servo motor 51b is rotated toward the right, the capacity adjustment bracket 51d is moved forward. When the rotational shaft 51c is rotated toward left, the capacity adjustment bracket 51d is moved backward. The central control unit controls the second servo motor 51b to decrease an angle of the cylinder 49c to make the rotational shaft 51c rotate toward left.

Accordingly, a side of the capacity adjustment bracket 51d inserted into the rotational shaft 51c is moved backward. An angle of the cylinder 49c connected to the other side of the capacity adjustment bracket 51d is decreased correspondingly so that a capacity of the cylinder 49c is decreased. Consequently, an amount of the liquid crystal drawn through the suction hole 49a is reduced correspondingly, an amount of the liquid crystal discharged from the liquid crystal discharge device is made to be the same with the preset amount.

When the liquid crystal amount inspection is finished, by proceeding the substrate taking-in, table moving, liquid crystal discharge device descending, liquid crystal dispensing, liquid crystal discharge device ascending, substrate taking-out steps periodically, the liquid crystal dispensing process is finished.

As described above, in the liquid crystal dispensing apparatus and the liquid crystal dispensing method, a difference between a liquid crystal amount discharged from the liquid crystal discharge device and a preset liquid crystal amount is measured, a capacity of the cylinder performing the suction/discharge of the liquid crystal is adjusted on the basis of the measured difference value, the difference value is compensated. Accordingly, it is possible to dispense an accurate amount of liquid crystal. As a result, it is possible to prevent picture quality lowering due to shortage or excess of liquid crystal, reduce liquid crystal loss and minimize a time required for a liquid crystal layer forming. In addition, by installing a pad having strong sealing characteristics at the end of the syringe and connecting the syringe to the liquid crystal suction hole by inserting a pin such as an injector needle into the pad, easy attachment and detachment of the syringe with the liquid crystal suction hole can be achieved. Moreover, by installing the nozzle unit protection cap to protect and manage the nozzle, liquid crystal can be dispensed onto the substrate securely while preventing the liquid crystal from being splashed in contact with the substrate.

It will be apparent to those skilled in the art that various modifications and variations can be made in the apparatus and method for dispensing liquid crystal of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus for dispensing liquid crystal onto a substrate, comprising:
    a frame;
    a table installed on the frame to have the substrate to be mounted thereon;
    at least one liquid crystal discharge device to adjustably discharge an amount of liquid crystal, the liquid crystal discharge device including a piston to perform ascending motions to draw in the liquid crystal and descending motions to discharge the liquid crystal with an angle of at least a portion of the liquid crystal discharge device determining a magnitude of the ascending/descending motion to control an amount of liquid crystal discharged; and
    a liquid crystal amount inspecting portion to inspect a liquid crystal dispensing amount by comparing an actual amount of liquid crystal discharged from the liquid crystal discharge device with a preset liquid crystal amount.

2. The apparatus according to claim 1, wherein a plurality of absorption holes are defined on the table to fix the substrate on the table.

3. The apparatus according to claim 1, wherein the table is movably installed on the frame to coordinate liquid crystal dispensing positions on the substrate with respect to discharging of the liquid crystal discharge device.

4. The apparatus according to claim 1, wherein the liquid crystal discharge device further includes a rotatable body and an arm member, the arm member projected from the piston and mated with the rotatable body so that the arm member pulls/pushes the piston in accordance with a rotation of the rotatable body to effect the ascending/descending motion.

5. The apparatus according to claim 4, wherein the piston performs a rotation motion together with the ascending/descending motion.

6. The apparatus according to claim 4, wherein an end of the arm member is inserted into a hole in the rotatable body.

7. The apparatus according to claim 1, wherein the liquid crystal discharge device further includes:
  a syringe unit to contain the liquid crystal;
  a cylinder having a liquid crystal suction hole for receiving the liquid crystal from the syringe unit and a liquid crystal discharge hole for discharging the liquid crystal; and
  a nozzle unit to dispense the liquid crystal discharged from the discharge hole of the cylinder onto the substrate,
    wherein the piston is inserted into the cylinder to perform rotation and ascending/descending motions such that the liquid crystal is drawn through the suction hole and discharged through the discharge hole.

8. The apparatus according to claim 7, wherein the liquid crystal discharge device includes:
  a first motor to provide a driving force to the piston;
  a second motor to provide a driving force for adjusting the angle of the cylinder;
  a rotational shaft connected to the second motor and having a screw thread thereon; and
  a capacity adjustment bracket to adjust a capacity of the cylinder by varying the angle of the cylinder according to the rotation of the rotational shaft, the capacity adjustment bracket having a first side coupled with the rotational shaft and a second side connected to the cylinder.

9. The apparatus according to claim 8, wherein the liquid crystal discharge device further includes a LVDT (linear variable differential transformer) to measure a displacement of the capacity adjustment bracket.

10. The apparatus according to claim 7, wherein the liquid crystal discharge device includes:
  a pad installed on the syringe unit;
  an injector needle inserted into the syringe unit through the pad; and
  a connection pipe combined with the injector needle to guide the liquid crystal from the syringe unit via the injector needle to the nozzle unit.

11. The apparatus according to claim 10, wherein the pad includes at least one of a silicone and a butyl rubber group.

12. The apparatus according to claim 10, wherein the liquid crystal discharge device further includes an air bubble sensor respectively formed at ends of the connection pipe to sense occurrences of air bubbles in the liquid crystal flowing through the connection pipe.

13. The apparatus according to claim 7, wherein the liquid crystal discharge device further includes a protection cap to protect the nozzle unit.

14. The apparatus according to claim 1, wherein the liquid crystal amount inspecting portion includes:
  a measuring cup to receive and contain the liquid crystal discharged from the liquid crystal discharge device; and
  an electronic scale to determine an amount of the liquid crystal contained in the measuring cup.

15. The apparatus according to claim 14, wherein the measuring cup is respectively installed at the both sides of the frame.

16. A method of manufacturing a liquid crystal display device using the liquid crystal dispensing apparatus according to claim 1, comprising the steps of:
  dispensing liquid crystal from the liquid crystal dispensing apparatus onto a first substrate; and
  attaching a second substrate with the first substrate so that the dispensed liquid crystal is disposed between the first and second substrates.

17. A method of manufacturing a liquid crystal display device using the liquid crystal dispensing apparatus according to claim 4, comprising the steps of:
  dispensing liquid crystal from the liquid crystal dispensing apparatus onto a first substrate; and
  attaching a second substrate with the first substrate so that the dispensed liquid crystal is disposed between the first and second substrates.

18. A liquid crystal dispensing method, comprising the steps of:
  calculating a liquid crystal dispensing amount by comparing an actual amount of liquid crystal dispensed from a liquid crystal discharge device with a preset liquid crystal amount, the liquid crystal discharge device including a piston to perform ascending motions to draw in the liquid crystal and descending motions to discharge the liquid crystal with an angle of at least a portion of the liquid crystal discharge device determining a magnitude of the ascending/descending motion to control an amount of liquid crystal discharged;
  adjusting the liquid crystal dispensing amount to be substantially equal to the preset liquid crystal amount by adjusting the angle;
  moving a substrate mounted on a table relative to liquid crystal discharge device so that the liquid crystal discharge device is positioned relative to an initial dispensing position;
  descending the liquid crystal discharge device to a first set distance above the substrate;
  dispensing the liquid crystal dispensing amount onto the substrate;
  ascending the liquid crystal discharge device to a second set distance above the substrate; and
  removing the substrate from the table.

19. The method according to claim 18, wherein the calculating step includes the steps of:
  determining the preset liquid crystal amount;
  dispensing liquid crystal into a measuring cup;
  determining an amount of liquid crystal dispensed into the measuring cup;
  comparing the determined liquid crystal amount with the preset liquid crystal amount; and
  calculating a difference value when the determined liquid crystal amount is different from the preset liquid crystal amount.

20. The method according to claim 19, wherein the adjusting step includes the step of controlling a liquid crystal capacity of the liquid crystal discharge device using a motor according to the difference value.

21. The method according to claim 18, wherein the liquid crystal discharge device further includes a rotatable body and an arm member, the arm member projected from the piston and mated with the rotatable body, wherein the dispensing step includes rotating the rotatable body so that the arm member pulls/pushes the piston in accordance with a rotation of the rotatable body to effect the ascending/descending motion.

22. A liquid crystal dispensing method, comprising the steps of:
calculating a liquid crystal dispensing amount by comparing an actual amount of liquid crystal dispensed from a liquid crystal discharge device with a preset liquid crystal amount, the liquid crystal discharge device having a piston to perform a pumping action;
moving a substrate mounted on a table relative to liquid crystal discharge device so that the liquid crystal discharge device is positioned relative to an initial dispensing position;
descending the liquid crystal discharge device to a first set distance above the substrate;
dispensing the liquid crystal dispensing amount onto the substrate by performing a pumping with the piston;
ascending the liquid crystal discharge device to a second set distance above the substrate; and
unloading the substrate from the table.

23. The method according to claim 22, further comprising the step of adjusting the liquid crystal dispensing amount to be substantially equal to the preset liquid crystal amount by adjusting the angle of a portion of the liquid crystal discharge device.

24. The method according to claim 22, wherein the pumping of the piston forms a four stage motor such that a suction hole is opened and a discharge hole is closed when the piston is disposed at a first position, the suction hole and the discharge hole are closed when the piston is disposed at a second position, the suction hole is closed and the discharge hole is opened when the piston is disposed at a third position, and the suction hole and the discharge hole are closed when the piston is disposed at a fourth position.

25. The method according to claim 22, wherein the piston performs ascending motions to draw in the liquid crystal and descending motions to discharge the liquid crystal with an angle of at least a portion of the liquid crystal discharge device determining a magnitude of the ascending/descending motion to control an amount of liquid crystal discharged.

26. The method according to claim 25, wherein the liquid crystal discharge device further includes a rotatable body and an arm member, the arm member projected from the piston and mated with the rotatable body, wherein the dispensing step includes rotating the rotatable body so that the arm member pulls/pushes the piston in accordance with a rotation of the rotatable body to effect an ascending/descending motion.

27. A liquid crystal discharging device, comprising:
a syringe to contain liquid crystal;
a cylinder having a liquid crystal suction hole for drawing in the liquid crystal from the syringe and a liquid crystal discharge hole for discharging the liquid crystal;
a piston inserted into the cylinder to perform rotation and ascending/descending motions and having a suction-discharge groove at the outer circumference thereof to draw the liquid crystal through the suction hole and to discharge the liquid crystal through the discharge hole;
a connection unit to guide the liquid crystal discharged through the discharge hole of the piston; and
a nozzle to dispense the liquid crystal received from the connection unit onto the substrate.

28. The device according to claim 27, further comprising:
a first motor to drive the piston;
a second motor;
a rotational shaft connected to the second motor and having a screw thread thereon; and
a capacity adjustment bracket to adjust a capacity of the cylinder by varying an angle of the cylinder according to the rotation of the rotational shaft, the capacity adjustment bracket having a first side coupled with the rotational shaft and a second side connected to the cylinder.

29. The device according to claim 28, wherein a manual lever is installed at the end of the rotational shaft to manually adjust the capacity adjustment bracket.

30. The device according to claim 28, further comprising a LVDT (linear variable differential transformer) to measure a displacement of the capacity adjustment bracket.

31. The device according to claim 27, wherein a pad is installed at a lower portion of the syringe, wherein the connection unit includes an injector needle, the injector needle being inserted into the syringe through the pad such that the liquid crystal flows from the syringe unit to the nozzle via the connection unit.

32. The device according to claim 31, wherein the pad includes at least one of a silicone and a butyl rubber group.

33. The device according to claim 27, further comprising a protection cap to protect the nozzle.

34. A method of manufacturing a liquid crystal display device using the liquid crystal discharging device according to claim 27, comprising the steps of:
dispensing liquid crystal from the liquid crystal dispensing device onto a first substrate; and
attaching a second substrate with the first substrate so that the dispensed liquid crystal is disposed between the first and second substrates.

* * * * *